T. W. BRACHER.

Sweat Band for Hats and Caps.

No. 9,331.

Reissued Aug. 3, 1880.

Witnesses

Otto Stupfeland

William Miller

Inventor.

Thomas W. Bracher by Van Santvoord & Hauff his attys

N. PETERS, PHOTO-LITHOGRAPHER, WASHINGTON, D. C.

UNITED STATES PATENT OFFICE.

THOMAS W. BRACHER, OF NEW YORK, N. Y.

SWEAT-BAND FOR HATS AND CAPS.

SPECIFICATION forming part of Reissued Letters Patent No. 9,331, dated August 3, 1880

Original No. 218,480, dated August 12, 1879. Application for reissue filed July 9, 1880.

*To all whom it may concern:*

Be it known that I, THOMAS W. BRACHER, a citizen of the United States, residing at New York, in the county and State of New York, have invented a new and useful Improvement in Sweat-Bands for Hats or Caps, of which the following is a specification.

This invention consists in a sweat-band having its edge cut down to about one-half the original thickness, and lapped or folded so that the thickness of the folded portion is substantially equal to that of the body of the article; also, in the combination, with a stretched-edge sweat-band, and with a reed or spring applied to such edge, of a fastening or stay adapted to hold the reed or spring against longitudinal displacement, thereby preventing the contraction of the stretched edge.

Figure 1:
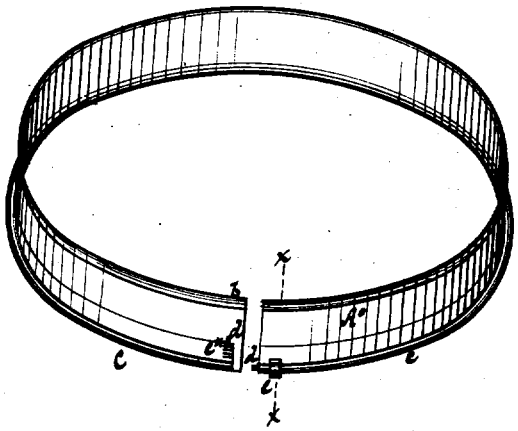
Figure 2:
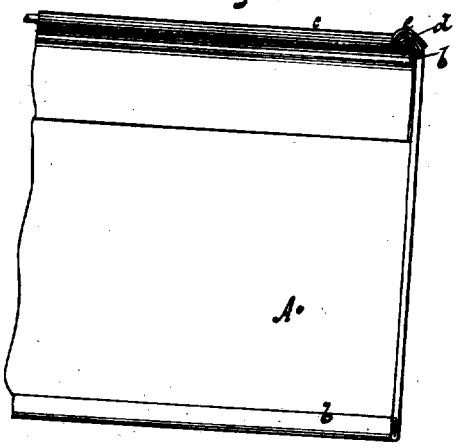
Figure 3:
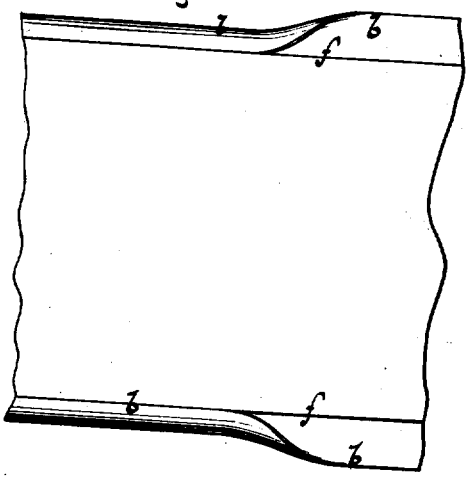
Figure 4:
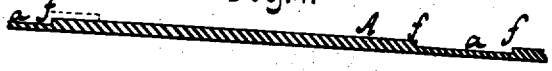

This invention is illustrated in the accompanying drawings, in which Figure 1 represents a perspective view. Fig. 2 is a cross-section taken on the line *x x*, Fig. 1, on a larger scale than in such figure. Fig. 3 is an inside view, showing the reduced edges partly folded. Fig. 4 is a cross-section of a piece of leather, or the like, used in carrying out my invention.

Similar letters indicate corresponding parts.

One way of carrying out my invention is to take the piece A, Fig. 3, of leather or other suitable material, and produce therein creases or furrows *a* at suitable distances apart from each other, by cutting down the material to about one-half its original thickness; then divide the piece A into strips A°, each suitable for a sweat-band, by cutting the same in the creases or furrows *a*, and then lap or fold the reduced edges *b b* thus given to each strip either upon themselves, as shown in Figs. 2 and 3, or on the body of the sweat-band. It follows that the folded part of the band A° obtains a thickness about equal to the original thickness of the material.

The edges *f f* of the creases or furrows *a* are straight, and when the reduced edges *b b* are folded over on the body of the article, in lieu of on themselves, one of the edges *f f* forms a guide, whereby a straight edge can be given to the article without difficulty.

In ordinary sweat-bands the folded part is twice as thick as the remaining portion of the article, and hence a clumsy appearance is produced, especially when the article is put into a hat or cap. In the sweat-band obtained by my invention the folded part presents a finished appearance and lies snugly against the head-opening without producing a clumsy appearance; and if one edge of the sweat-band is stretched so as to form a flange or brim extending over the edge of the head-opening, the advantage of the reduced part is still more apparent.

If the edge of the sweat-band is stretched so as to form a flange or brim, *c*, this flange is liable to lose its shape when the material becomes damp and contracts in drying, or when the article is handled injudiciously. A reed or spring, *d*, is used to counteract this tendency, the same being inserted into or fastened to the folded edge; but if, in handling the sweat-band before the same is put to use, the reed or spring is permitted to slide in or on the folded edge, its effect in keeping such edge stretched is lost. This difficulty I have overcome by applying to the reed or spring *d* a fastening or stay, *e*, adapted to prevent its longitudinal displacement. This fastening may be a metallic device, or it may be formed by turning or bending down the end of the reed or spring, and, if desired, stitching the same in this position, as at *e**, and when the sweat-band has been cut to the proper length, ready to be inserted in a hat or cap, the fastening may be removed, if of suitable character.

I do not claim, broadly, a sweat band or leather lapped at its edges, or the combination of a lapped and stretched sweat-band having a lining attached to the band by a row of stitches and having a flap adapted to be folded over the row of stitches and protect the hat or cap against perspiration which may follow the threads composing the stitches.

What I claim as new, and desire to secure by Letters Patent, is—

1. A sweat-band for hats or caps having its edge cut down to about one-half the original thickness and folded, substantially as described, to render the thickness of the folded portion about equal to that of the body of the article.

2. The combination, with a stretched-edge sweat-band, and with a reed or spring applied to such edge, of a fastening or stay adapted to hold the reed or spring against longitudinal displacement, substantially as described.

In testimony that I claim the foregoing I hereunto set my hand and seal this 8th day of July, 1880.

THOMAS W. BRACHER. [L. S.]

Witnesses:
CHAS. WAHLERS,
J. VAN SANTVOORD.